United States Patent [19]

Pavageau et al.

[11] Patent Number: 5,480,251
[45] Date of Patent: Jan. 2, 1996

[54] ASSEMBLY FOR PRODUCING FRAMEWORKS

[75] Inventors: Francois Pavageau; Edith Pavageau, both of Nantes, France

[73] Assignee: X 2 M France S.A., St Mars La Jaille, France

[21] Appl. No.: 145,506

[22] Filed: Nov. 4, 1993

[30] Foreign Application Priority Data

Dec. 21, 1992 [FR] France .................. 92 15335

[51] Int. Cl.⁶ ........................... F16B 7/04
[52] U.S. Cl. ............... 403/256; 403/79; 403/187; 403/322; 52/736.2
[58] Field of Search ............... 403/230, 256, 403/260, 252, 322, 321, 187, 189, 199, 79, 161, 405.1, 406.1, 407.1; 52/721, 726.1, 727, 730.2

[56] References Cited

U.S. PATENT DOCUMENTS

| | | | |
|---|---|---|---|
| 3,552,783 | 1/1971 | Tauano | 403/189 |
| 3,574,367 | 4/1971 | Jankowski | 403/322 X |
| 3,701,553 | 10/1972 | Vogt | 403/189 |
| 4,455,103 | 6/1984 | Hackenberg | 403/406.1 X |
| 4,783,189 | 11/1988 | Bugg | 403/264 |
| 4,799,819 | 1/1989 | Swoboda | 403/252 |
| 4,998,702 | 3/1991 | Reuter et al. | 403/157 X |
| 5,143,474 | 9/1992 | Vieler | 403/187 X |

FOREIGN PATENT DOCUMENTS

| | | | |
|---|---|---|---|
| 0517330 | 12/1992 | European Pat. Off. . | |
| 1361398 | 4/1964 | France | 403/187 |
| 2518192 | 6/1983 | France | 403/405.1 |
| 2624153 | 6/1989 | France . | |
| 2653836 | 5/1991 | France | 403/79 |
| 2667011 | 3/1992 | France . | |
| 1204404 | 9/1970 | United Kingdom . | |
| 2052003 | 1/1981 | United Kingdom | 403/187 |

Primary Examiner—Eric K. Nicholson
Assistant Examiner—Harry C. Kim
Attorney, Agent, or Firm—Young & Thompson

[57] ABSTRACT

An assembly of reinforced hollow beams comprises a connection member and an assembly element (8) adapted to be inserted coaxially and then fixed within a stiffening core (2) of a first hollow beam (1) by a suitable immobilization member (10). A positioning member (5) is introduced through one of the surfaces of a second hollow beam (1) so as to open within the interior of the stiffening core (2) of the second hollow beam and to be immobilized within this core (2) by a suitable second immobilization member (6). The positioning member (5) is fixed to the assembly member (8) by a cross member (7) secured on the positioning member (5). The assembly is useful in providing supporting or self-supporting frameworks for added or integrated constructions.

15 Claims, 6 Drawing Sheets

ASSEMBLY FOR PRODUCING FRAMEWORKS

FIELD OF THE INVENTION

The present invention relates to an assembly for the production of supporting or self-supporting frameworks of integrated constructions of the sun porch type, or added constructions of the porch type or the like, by means of elements in the form of reinforced hollow beams.

BACKGROUND OF THE INVENTION

Numerous lightweight constructions, such as porches, greenhouses, penthouses, sun porches, skylights or the like, made from an assembly of metal profiles, in light alloys such as aluminum, are well known. However, such constructions, generally because they are too light, cannot support traditional roofs. There have also therefore been developed frameworks particularly of wood so as to provide elements of a sufficient cross section to ensure the support of the load. However, such structures have the drawback of using, for their interconnection, members such as pegs, tenons, mortises, joints, frames or butt joints which require on the one hand preliminary preparation in the shop with supplemental adjustment of the elements in place, and on the other hand a mounting and adaptation of the members which requires the skill of a carpenter and the know-how of this latter. Because of this, industrialization of such a type of framework is not foreseeable.

To overcome this drawback, various frameworks have already been proposed. Thus, the patent FR-A-2.624.153 describes a support structure for added constructions constituted by elements in the form of hollow beams of wood generally formed of plywood, each beam comprising internally a central hollowed portion and on its external surfaces at least one longitudinal groove adapted to receive the heel of a connecting member interconnecting one element to another so as to form a predetermined angle.

Such a type of structure provides only a partial solution to the problem because the fact of working with connecting members which directly penetrate the wood beam involves problems of rigidity as well as aesthetic problems.

Another structure in the form of hollow beams of plywood and comprising a core of internal stiffening material is described in the patent FR-A-2.667.011. In this patent, the connection means of two beams to each other are constituted by right angle braces fixed within the stiffening core of said beams. Because of this, the possibilities for the construction of a framework with such connecting members are severely limited.

SUMMARY OF THE INVENTION

The aim of the present invention is therefore to provide an assembly which permits overcoming these above drawbacks, by permitting the conception and use of mixed structures, while avoiding the usual final adjustment operations of the wood parts which are on the contrary provided to be adapted directly to other elements also in wood or metal thanks to connecting members whose use requires no particular adjusting operation.

To this end, the invention has for its object an assembly for producing supporting or self-supporting frameworks of integrated construction, of the sun porch or added type, such as verandas or the like, by means of elements in the form of hollow beams whose recessed portion is filled at least partially with a stiffening core obtained from at least one hollow metallic profile extending inside this element over essentially all of its length, each element being assembled to another by means of a connecting member, characterized in that said connecting member comprises a first assembly element adapted to be inserted coaxially and then fixed within the stiffening core of a first element by means of a first suitable securement member, a positioning member secured on or in a second element by means of a second appropriate securement member which passes through at least one wall of the second element and at least one surface of the stiffening core of said second element, said positioning member being fixed to or articulated on the first assembly element, either directly or by means of a crosspiece.

According to a first embodiment of the invention, the assembly element is constituted by a strap, the positioning member is constituted by a socket and the crosspiece is constituted by a stem, the assembly being fixed and mounted in the unitary assembly by screwing and pinning.

According to a second embodiment of the invention, the assembly element again has the shape of a strap whose legs are fixedly secured together by means of a suitable connecting member, the positioning member is a member bearing on one of the elements forming a beam, this member being fixed on said beam by means of a screw and comprising a second opening permitting a direct articulated connection with the assembly element, the assembly being fixed and mounted securely by screwing and pinning.

BRIEF DESCRIPTION OF THE DRAWINGS

Other characteristics and advantages of the invention will become apparent from a reading of the description which follows and the accompanying drawings, which description and drawings are given by way of example. In these drawings.

DETAILED DESCRIPTION OF THE INVENTION

According to the invention, the elements necessary for the production of the assembly are present in the form of hollow beams 1, generally of wood, and made from an assembly of suitable wooden pieces joined together and cemented together according to the so-called plywood technique. This beam is produced so as to comprise in its central portion a hollow portion filled at least partially by means of a stiffening core 2. The hollowed portion of the plywood beam is provided after cutting off a cap along the length of the beam, by recessing the beam so as to constitute a groove for reception of the stiffening core. The stiffening core is generally constituted by a metallic profile which extends within the wooden body over all its length. The beam is then reconstituted by recementing the cover. These elements constituted by hollow beams are then assembled by means of suitable connection members.

One could also, in another embodiment of these beams, produce said beams by cementing wooden elements about the metallic core according to a technique typical of plywood.

The section of these profiles can be anything at all but generally recourse will be had to parallelepipedal elements.

Figure 5:
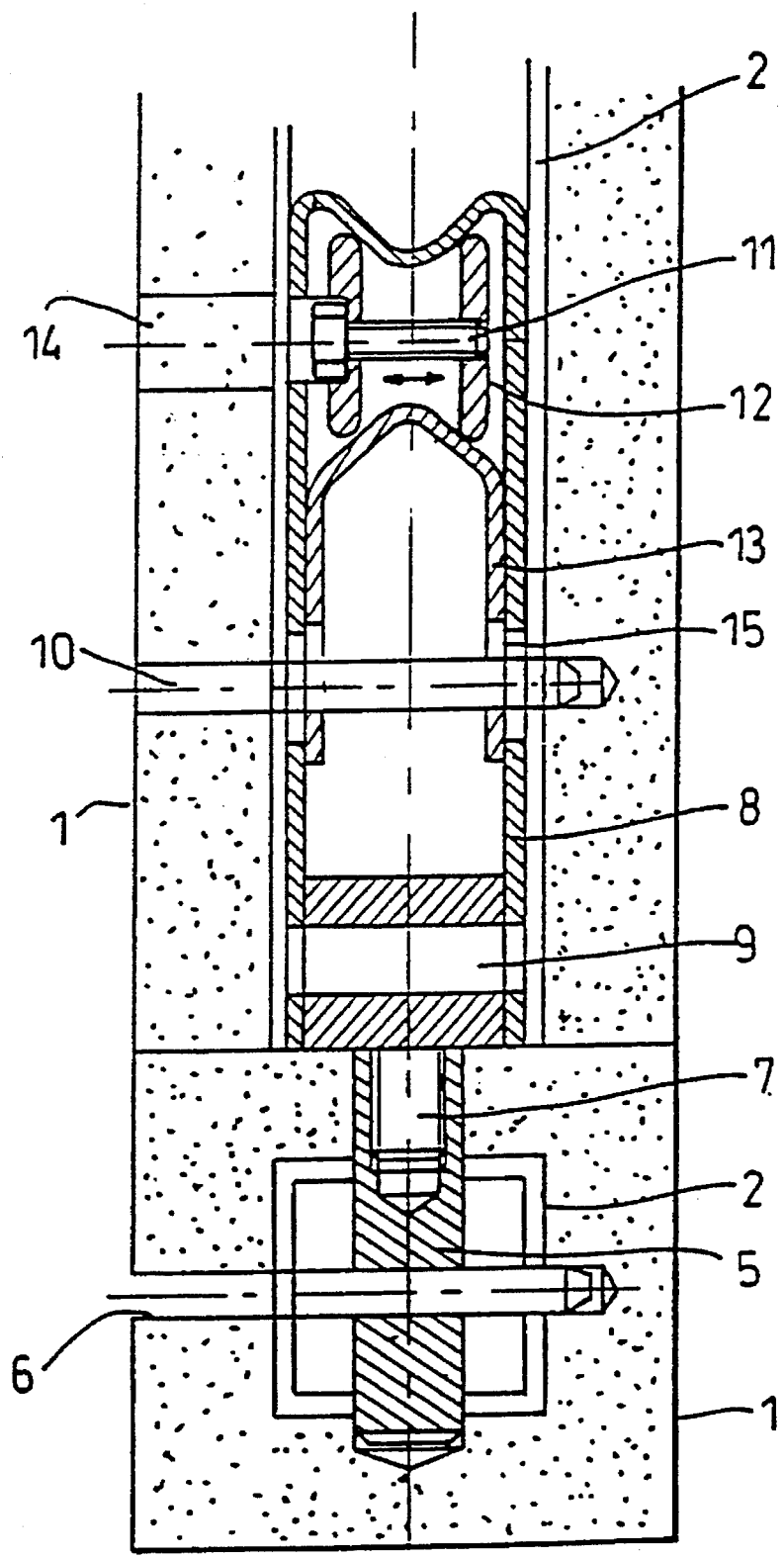
FIG. 5 shows a view in cross section of two elements secured together by means of an assembly member articulated in one plane.

The connecting member permitting the interconnection of two elements 1 comprises, as shown in FIG. 5, an assembly element 8 adapted to be inserted coaxially and then fixed in the stiffening core 2 of a first element 1 by means of a first suitable securement member 10, a positioning member 5 introduced through one of the surfaces into a second element 1 so as to emerge within the interior of the stiffening core 2 of the second element and to be fixed within this core 2 by means of a second suitable securement member 6, said positioning member 5 being fixed to the assembly element 8 by means of a cross member fixed to the positioning member 5.

In this first embodiment, three elements interact to connect the two elements 1 constituted by reinforced hollow beams. These three elements are constituted by an assembly element 8, a positioning member 5 fixed to the assembly element 8 by means of a cross member 7 which constitutes the third element. The positioning member 5 can, according to the articulation knuckle before being formed, which is to say according to the number of beams before being secured to a same element, have a large number of shapes. This embodiment will be described in detail hereinafter.

Figure 1:
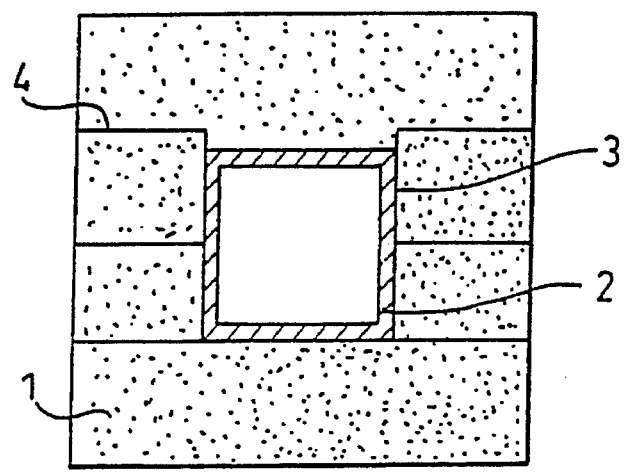
FIG. 1 shows a cross sectional view of the elements present in the form of hollow beams before being assembled.
Figure 2:
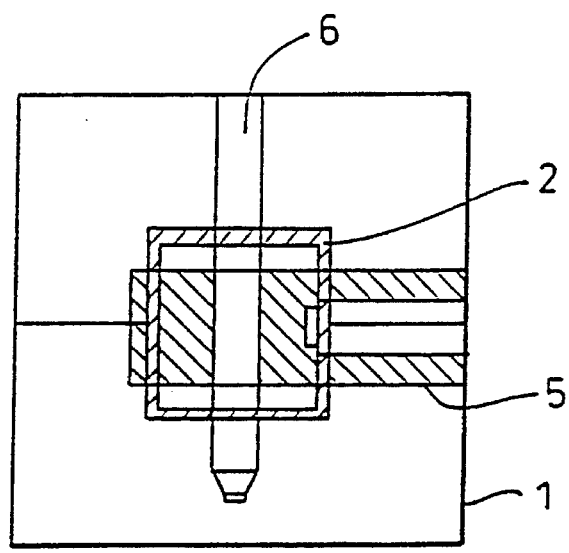
FIG. 2 shows a cross sectional view of the hollow beam of FIG. 1 and provided with a positioning member.
Figure 3:
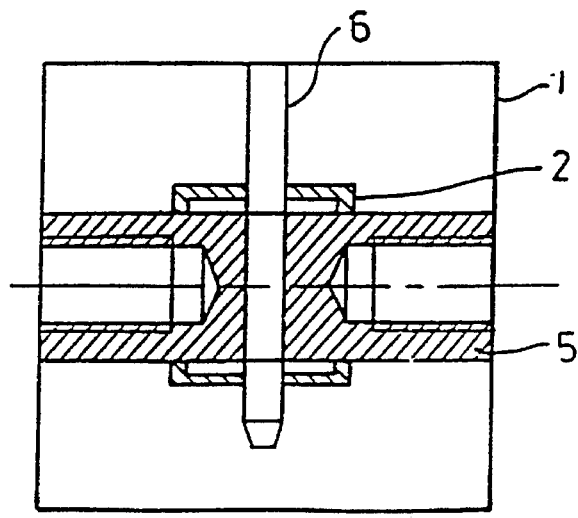
FIG. 3 shows a cross sectional view of the same beam provided with a positioning member permitting the connection of two beams.

Thus, FIG. 2 shows a view in cross section in which the positioning member 5 is adapted to permit the connection of the hollow beam 1 with a single beam, while FIG. 3 shows a positioning member 5 adapted to permit the connection of the hollow beam 1 with two beams disposed on two parallel surfaces of the beam 1. In the case of FIG. 2, the positioning member 5 is constituted by a socket introduced by means of a first through hole extending into the stiffening core 2 of the beam and passing through two parallel surfaces of this core 2. This socket 5 is then fixed by means of a pin 6 also introduced into the beam 1 and the stiffening core 2 through a second hole whose axis crosses the axis of the first hole. It is to be noted that these holes can be effected by means of a template. This first socket 5 comprises a screw threading which coacts with screw threading of the cross member.

In the case of FIG. 3, this socket is adapted to receive two beams. As a result, the two sockets disposed within a single and same member 5 are disposed on opposite sides of the securement member again constituted by a pin 6.

Of course, there could be similar mountings for the securement of beams on the four faces of the beam 1.

The assembly element 8 is itself formed by a cover which can, according to the type of assembly element produced, be articulated or not on the cross member 7.

Figure 4:
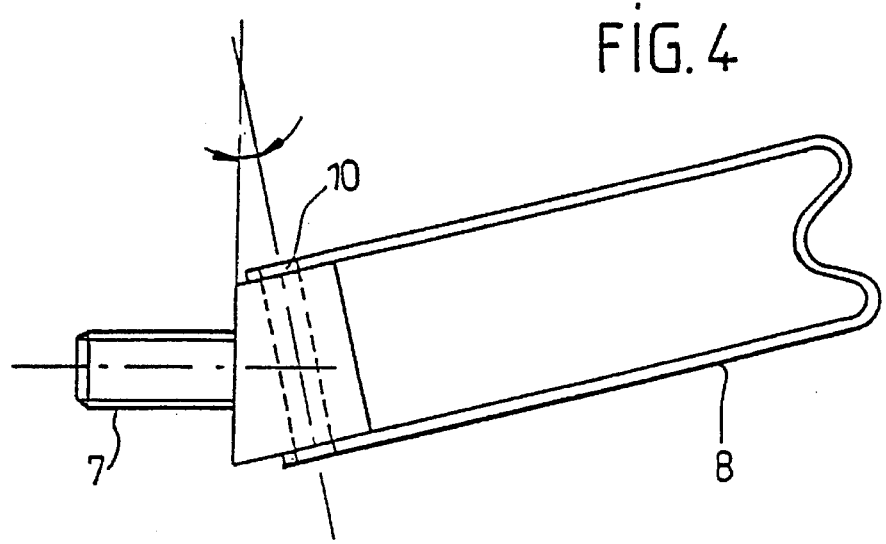
FIG. 4 shows an assembly element associated with a connecting member so as to delimit with this latter a predetermined fixed angle.
Figure 7:
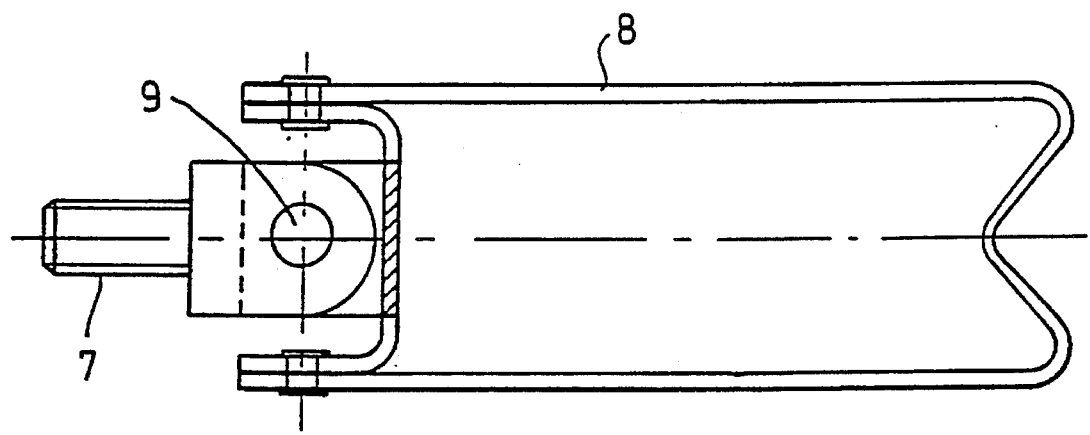
FIG. 7 shows the assembly element mounted fixedly on a cross member by means of an articulation permitting a displacement in two planes.
Figure 6:
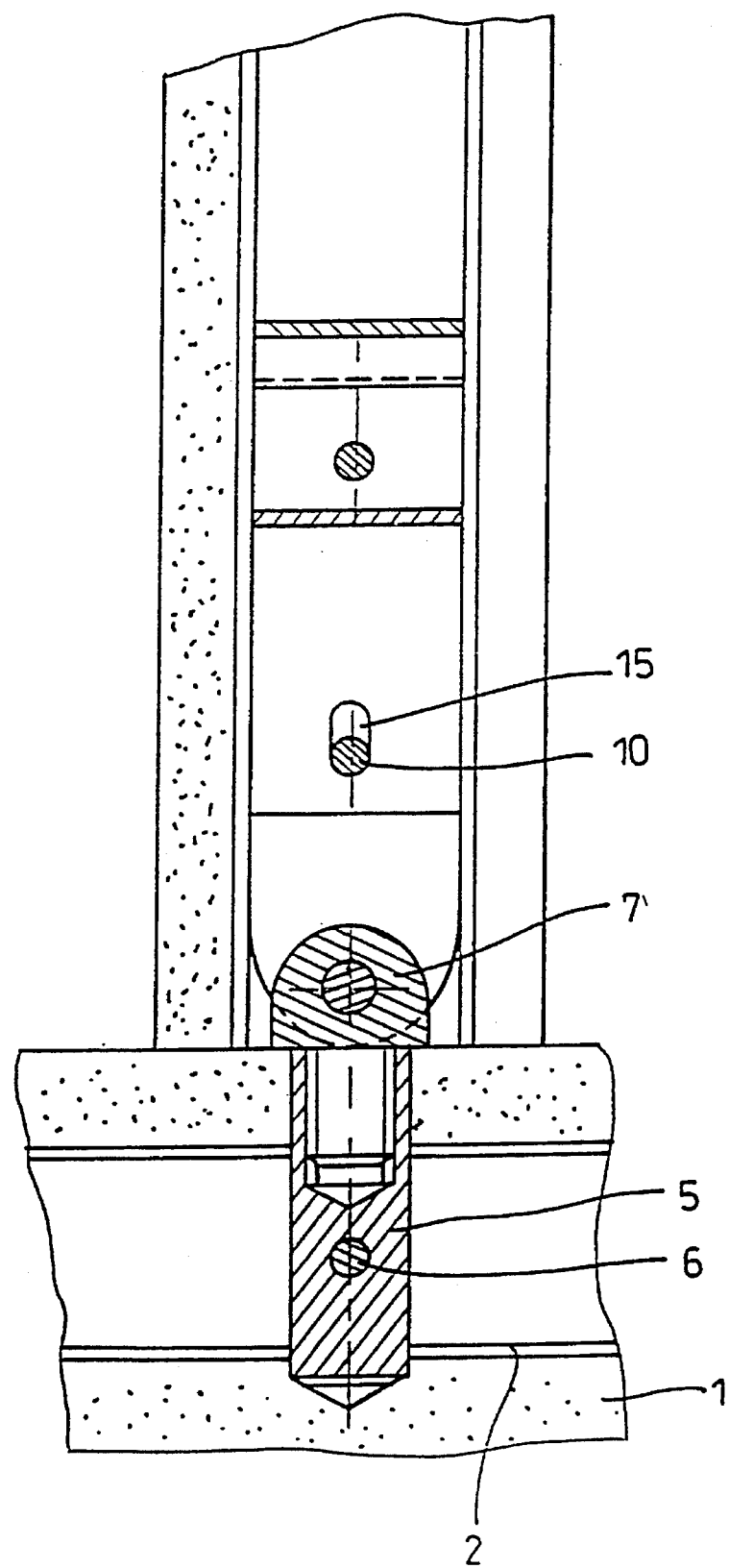
FIG. 6 shows this same assembly of two elements in cross section from above.

FIGS. 4, 5 and 6 show three different embodiments of the assembly element 8. In the case of FIG. 4, the assembly element is of simple configuration. Thus, this assembly element 8 is mounted fixedly on the cross member 7 and delimits with this latter a predetermined angle which corresponds generally to an angle used in known manner in construction, such as 15°, 30° or 45°.

In this type of configuration, it is further possible to have two embodiments of this assembly element. In a first embodiment, the cross member 7 and the cover 8 are formed from a single member, the cover 8 comprising then only a hole 9 adapted to receive the securement member, such as a pin, mounted so as to pass through said hole so as to immobilize the assembly member 8 in the beam 1. It could also be provided, in a second embodiment, that the cross member 7 will be articulated and in particular mounted for rotation on the cover 8 by means of an axle passing through the hole 9 so as to permit pivoting of the cover 8 about this axle while maintaining in a second plane a predetermined fixed angle.

FIG. 5 shows a more complicated embodiment of the assembly member. In this case, this latter comprises a cover 8 of general U-shape, whose legs grip a locking spindle 13 having relative axial movement within said cover 8. This locking spindle 13 is disposed within the cover 8 so as to provide between the head and the spindle 13 and the bottom of the cover 8 a free space 12 within which is disposed a gripping member for the beams against each other. This gripping member can be constituted either by a gripping wedge 11, as shown in FIG. 5, or by a cam (not shown).

In the case of use of a gripping wedge 11, the principle of operation is as follows. This gripping wedge 11 comprises an axle adapted to be driven in rotation in a direction perpendicular to the longitudinal axis of the cover by means of a control member such as a key with six hollow sides introduced through a through hole 14 disposed facing one end of the head of this rotation axle. This rotation axle comprises also two slidable plates adapted to move along the axle so as to approach or move away from each other simultaneously. During their approach, these plates coact with the bottom of the cover 8 and the head of the locking spindle 13 so as to exert a tractive force on the cover permitting by mutual reaction to apply the first and the second beams tightly against each other. Of course, to do this, the shape of the bottom of the cover 8 must be specific. The same is true for the head of the locking spindle 13. Thus, it will be noted in FIG. 5 that the bottom of the head 8 has a concave shape such that, during the approach to each other of the plates, they will drive the cover 8 in movement in a direction identical to the direction of introduction of the cover 8 into the stiffening core of the hollow element. Conversely, the shape of the head of the locking spindle 13 is convex such that, when the plates approach each other, they drive in displacement the locking spindle 13 in a direction opposite that of the cover 8. The cover 8 and the locking spindle 13 are immobilized within the metallic profile by means of a pin 10 introduced via through-holes facing holes borne by the parallel surfaces of the cover 18 and of the locking spindle 13, these holes provided in the locking spindle and the cover constituting guide passageways. The cross member 7 is, in this type of configuration of the assembly element, generally mounted articulatedly on this assembly element by means of an articulation element which, on the one hand, passes through the head of the cross member 7, and on the other hand two parallel surfaces of the cover 8. Thus, as shown in FIG. 6, the cross member is present in this case in the form of a spindle whose head comprises a hole and has the general shape of ears; as to the tail of this spindle, it is constituted by a screw-threaded rod which coacts with the threading on the positioning member 5 constituted by a socket.

Finally, in a last embodiment (not shown) of the assembly element permitting a displacement in two planes of the second beam relative to the first beam, the assembly element is articulated on the cross member by means of a cross bar so as to constitute with this latter a cardan-type joint.

It will be noted that, in all the illustrated examples, the cross member 7 is represented by a spindle having a rod provided with holes permitting receiving the articulation axle of the cover 8 and a tail constituted by a screw threaded projecting rod which coacts with the screw threading of the positioning member 5.

There could of course be provided a large number of other solutions to fix the cross member 7 to the positioning member 8. The positioning member could thus be constituted by a screw threaded rod which coacts with a screw threading of the cross member 7. There could also be envisaged a wedged or snap-in locking or a locking by elastic deformation of the positioning member 5 or of the cross member 7 relative to the other member.

Figure 8:
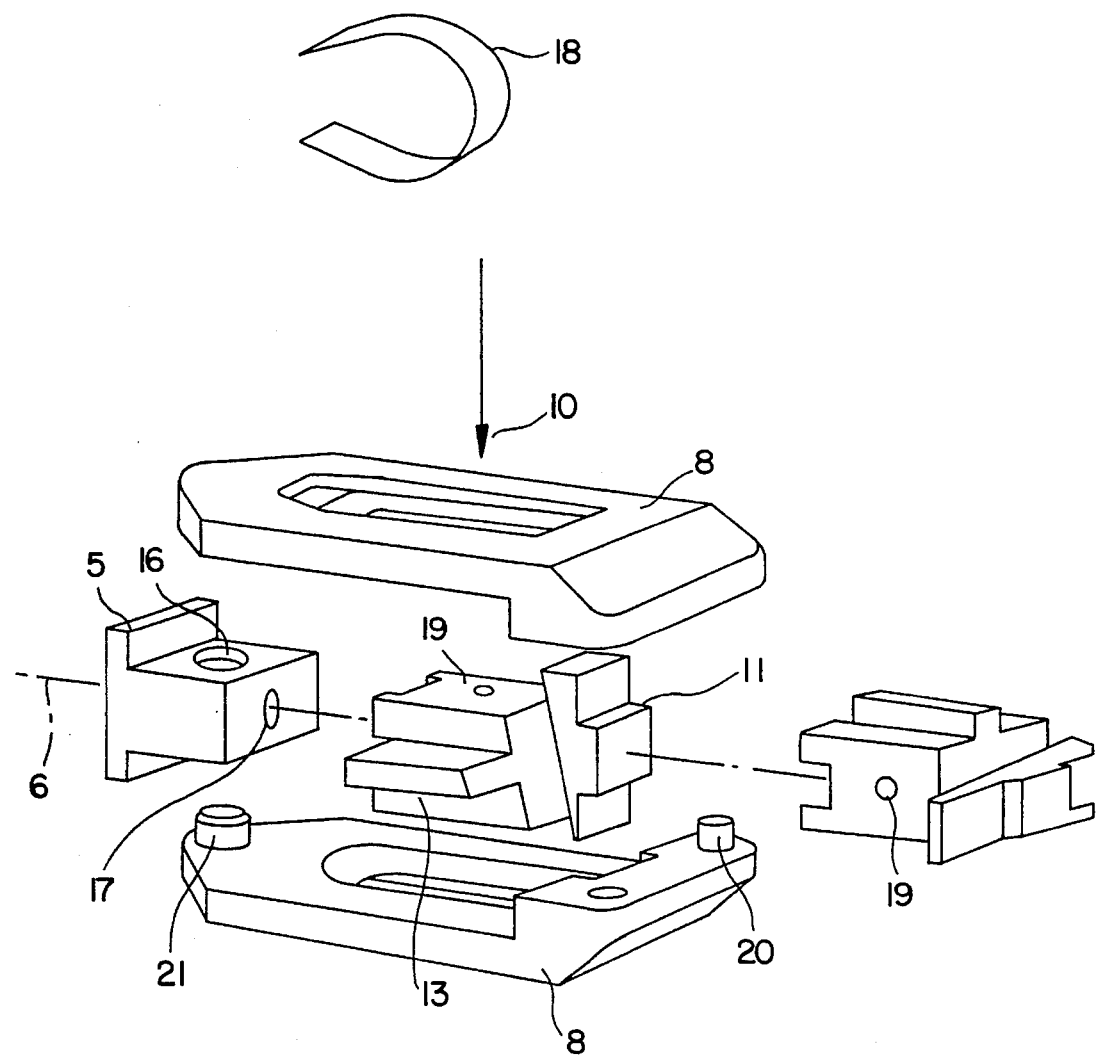
FIG. 8 shows an exploded perspective view of another embodiment of the assembly.
Figure 9:
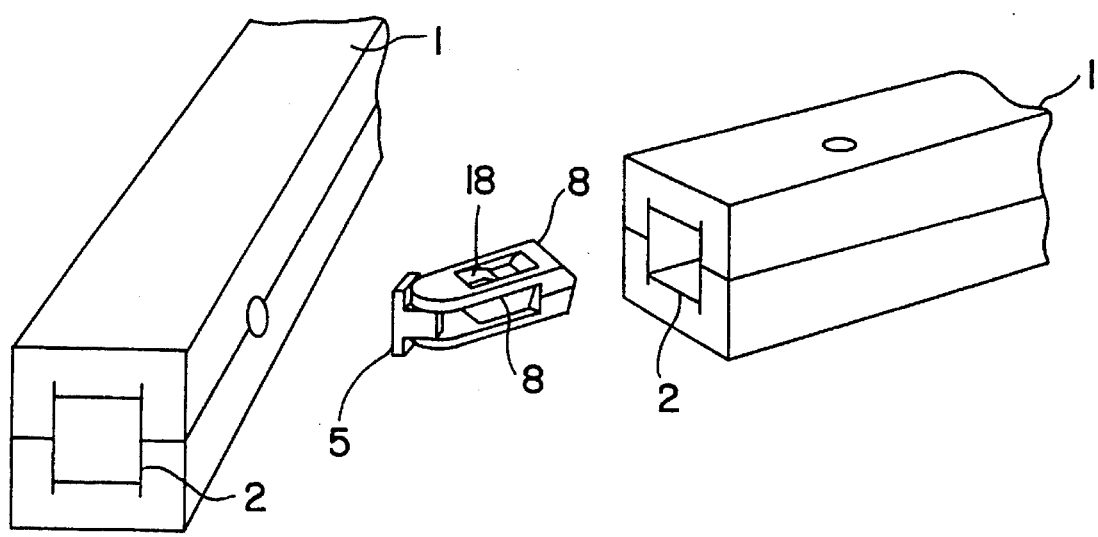
FIG. 9 shows an overall view of the assembly of FIG. 8.

It is also possible to provide another extremely simple embodiment of the invention which permits in particular the omission of the cross member connecting the positioning member 5 and the assembly element 8. This embodiment is shown in FIGS. 8 and 9 and constitutes a more universal assembly than the assemblies described above. In this case, the assembly element 8 constitutes again an insert having the shape of a strap and adapted to be inserted coaxially and then fixed in the stiffening core 2 of a first element 1 by means of a first fixing member 10 generally constituted by a screw. Differently from the other embodiments, the legs of this strap are not formed from a single piece but are on the contrary secured to each other by means of at least one suitable connection member such as a spring blade 18. Another connecting member for the legs of this strap is formed by two lugs 20 disposed facing the contiguous ends of the legs of the strap, said lugs disposed on one leg entering into a recess provided in the facing surface of the leg which is opposite.

In the same manner as in the examples described above, the assembly element 8 formed by two half straps grips between its legs a locking member 13 which has movement relative to the interior of said element such that it defines with the bottom of said element 8 a free space within which can be disposed either a locking wedge 11 or a cam.

In the example shown in FIG. 8, there is a stationary locking wedge immobilized during assembly of the half straps 8. This locking member 13 has the shape of a cruciform nut comprising a through bore 19 adapted to receive a screw for displacement of the nut. The introduction of the screw in this bore 19 and the gripping of this screw have the effect of ensuring the mounting of the cruciform nut which, by a wedging effect, pushes the wedge 11 bearing against the strap and thus, by reaction, strongly grips the two elements forming the beam against each other. The principle of operation of such an assembly is therefore analogous to that described above.

The interest in such an arrangement resides in the fact that the nut 13 and the gripping wedge 11 can occupy two positions orthogonal to the interior of the assembly 8 so as to multiply the accessibility to the displacement screw of the nut. The two positions are shown in FIG. 8. It will be noted that the through bore 19 can be disposed either facing the two through holes provided in the two half straps, or a through hole 19 can be disposed orthogonally to the axis passing through the through holes provided in the two surfaces of said strap. Because of this, it is possible to displace the nut by introducing the screw through any one of the surfaces of the element 1 in the interior of which is inserted the assembly member 8. It is to be noted that, there again, to simplify the embodiment of the assembly, the displacement screw of the nut constitutes generally the immobilization element 10 of the assembly element 8 in the first element 1. The positioning member 5 fixed to the second element 1 and connected to the assembly element 8, has the general shape of a T in FIG. 8. Thus, in this case, the positioning member is constituted by a member which has a bearing surface that is disposed flat against one of the surfaces of a second element 1. This member is fixed on said second element 1 by means of an immobilization member such as a screw 6 which passes through a through bore 17 provided in the principal leg of the T. The wings of the T constitute the sole bearing surfaces of the positioning member 5 on the element 1. The stem of the T or tongue comprises also two other bores 16 which can be through bores or not, which coact with projecting members such as lugs 21 disposed on each of the free ends of the strap or assembly element 8, the assembly of lugs and bores forming an articulation axle such that, during its assembly, the assembly element 8 can be adjusted angularly by displacement about said axle so as to obtain a suitable orientation of the two elements 1.

It is to be noted that, in this embodiment of the positioning member 5, the immobilization member 6 of the positioning member 5 on the second element 1 is constituted by a self-tapping screw which passes through on the one hand a wall of said second element 1 and at least one surface of the stiffening core 2 of said second element 1. Thanks to such an embodiment of the invention, it is possible to obtain no matter what connection angle between the two beams 1 and to ensure an application of the two beams against each other by introducing the immobilization member of the assembly element 8 through any one of the surfaces of the beam at the interior of which is introduced coaxially the assembly element 8.

Of course, in all the above embodiments, it is desirable for providing such a type of connection to prepare the ends of the beams by effecting the necessary angular cuts to obtain the desired orientation of the beams relative to each other. These cuts as well as the holes can be effected by means of suitable template.

The interest for such a construction is to be able to permit the provision of mixed constructions, of the type aluminum/wood, requiring no technical competence, the sole work to be performed on the beams being to adjust their length as a function of the construction, which requires only the use of a cutting tool of the saw type or the like.

We claim:

1. Assembly for producing supporting or self-supporting frameworks for integrated constructions with elements having the shape of hollow beams whose hollowed out portion is filled at least partially with a stiffening core obtained from at least one hollow metallic profile extending within each element essentially along all of its length, said each element being assembled to other elements by a connection member, said connection member comprising an assembly element adapted to be inserted coaxially and then fixed within the stiffening core of a first element by a first immobilization member, a positioning member immobilized with respect to a second element by a second immobilization member which passes through at least one wall of the second element and at least one surface of the stiffening core of said second element, said positioning member being connected to the assembly element, said assembly element being an insert having the form of a strap with legs, and gripping between its legs a locking member having relative movement within said assembly element such that it provides with the bottom of said assembly element a free space within which is disposed gripping means which coacts with the locking member during displacement of one of the gripping means and locking member to exert on the assembly element a tractive force permitting by mutual reaction the application of the first and second elements closely against each other.

2. Assembly according to claim 1, wherein the legs of the strap are formed by a single piece.

3. Assembly according to claim 1, wherein the legs of the strap are fixedly interconnected by another connection member.

4. Assembly according to claim 1, wherein the insert forming the assembly element comprises two parallel surfaces provided with a through hole for receiving the first immobilization member introduced through a hole provided on one of the surfaces of the first element and disposed facing the through hole of the insert.

5. Assembly according to claim 1, wherein the locking member having relative movement within said assembly element is a locking spindle having a head, said spindle providing between the head and the bottom of the assembly element the free space within which is disposed the gripping means.

6. Assembly according to claim 1, wherein the gripping means is a stationary wedge, and said locking member having relative movement within said assembly element is a cruciform nut comprising a through bore adapted to receive a displacement screw for the nut, said nut coacting with the stationary wedge during its displacement to ensure an immobilization by locked gripping of the assembly element in the first element and the application of the first and second elements closely against each other.

7. Assembly according to claim 6, wherein the nut and the stationary wedge can occupy two orthogonal positions within the assembly element to increase the accessibility to the displacement screw of the nut.

8. Assembly according to claim 6, wherein the displacement screw of the nut constitutes the first immobilization member of the assembly element in the first element.

9. Assembly according to claim 1, wherein the displacements of the gripping means are obtained by rotation of an axle controlled by a control member introduced through a through bore provided coaxially to the axle and arranged in the wall of the first element.

10. Assembly according to claim 1, wherein the positioning member is a socket introduced through a first hole through at least one wall of the second element and at least one surface of the stiffening core, said positioning member being immobilized within the second element by the second immobilization member introduced through a second through hole whose axis intersects the axis of the first hole.

11. Assembly according to claim 1, wherein the positioning member is fixed to the assembly element via a cross member, said positioning member having securement means complementary to securement means of the cross member so as to immobilize the cross member with respect to the positioning member.

12. Assembly according to claim 11, wherein the cross member is constituted by a spindle having a screw threaded or tapped rod coacting with a tapping or screw threading of the positioning member and a head on which said assembly element is articulated via articulation means, said articulation means permitting a predetermined orientation of the assembly element.

13. Assembly according to claim 11, wherein the cross member has a longitudinal axis and comprises a spindle having a screw threaded or tapped rod which, at one of its ends, coacts with a tapping or screw threading of the positioning member, and at its other end is mounted on the assembly element, said assembly element having a transverse axle which forms with the longitudinal axis of the cross member a predetermined angle.

14. Assembly according to claim 1, wherein the positioning member has a surface bearing on the second element and comprises a tongue on which is connected the assembly element inserted in the stiffening core of the first element for connection to said second element, said tongue comprising a through bore adapted to receive the second immobilization member of the positioning member in the first element, said second immobilization member passing through at least one wall of the second element and at least one surface of the stiffening core of said second element.

15. Assembly according to claim 14, wherein each of the legs of the strap has a free end on which a projecting element is disposed, said projecting element adapted to be mounted pivotally within an opening arranged on the tongue of the positioning member to permit an angular positioning of the first and second elements.

* * * * *